H. BAUDISCH.
HYDRAULIC PROCESS OF AND APPARATUS FOR CONVERTING ENERGY.
APPLICATION FILED MAY 8, 1916.

1,347,578.

Patented July 27, 1920.
5 SHEETS—SHEET 1.

Inventor
Hans Baudisch
by
Attorney

H. BAUDISCH.
HYDRAULIC PROCESS OF AND APPARATUS FOR CONVERTING ENERGY.
APPLICATION FILED MAY 8, 1916.
1,347,578.
Patented July 27, 1920.
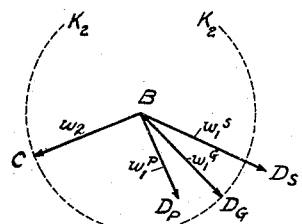
Fig. 6 a
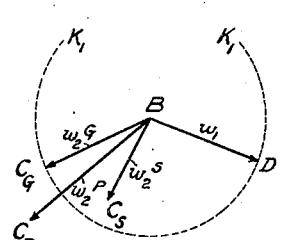
Fig. 6 b
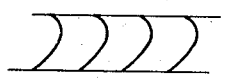
Fig. 7 a
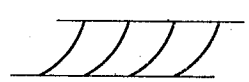
Fig. 7 b
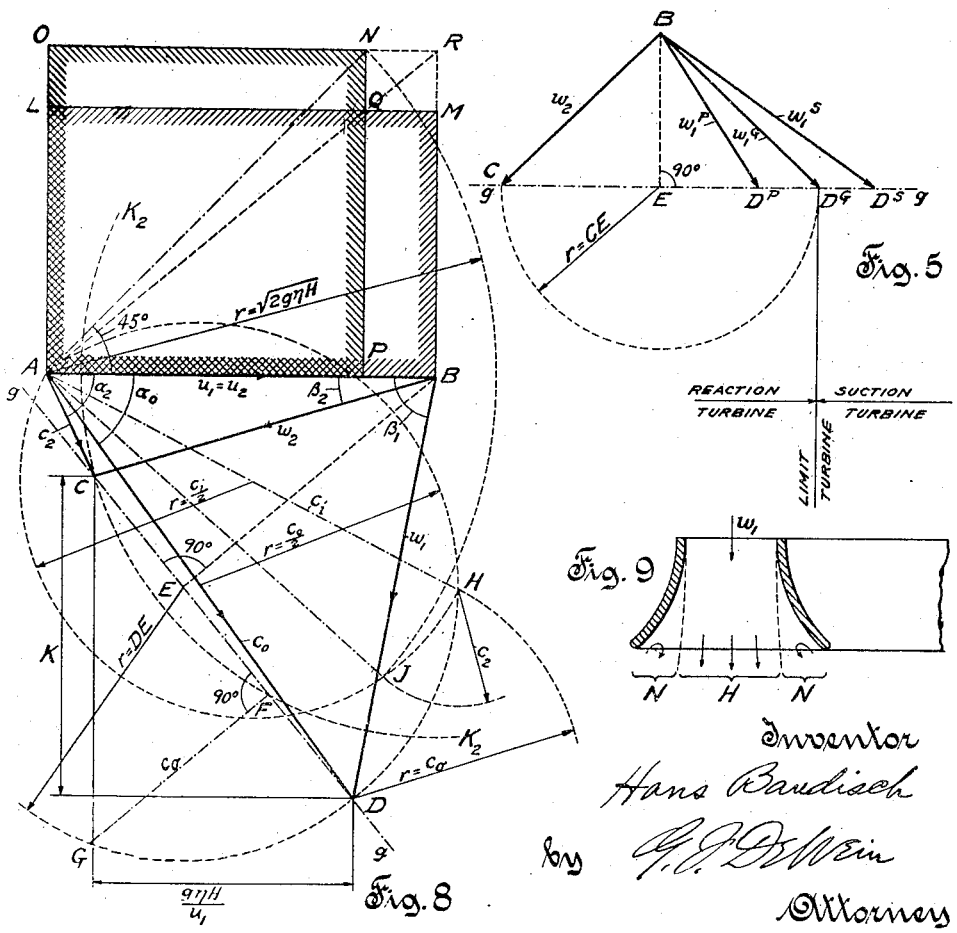
Inventor
Hans Baudisch
by
Attorney

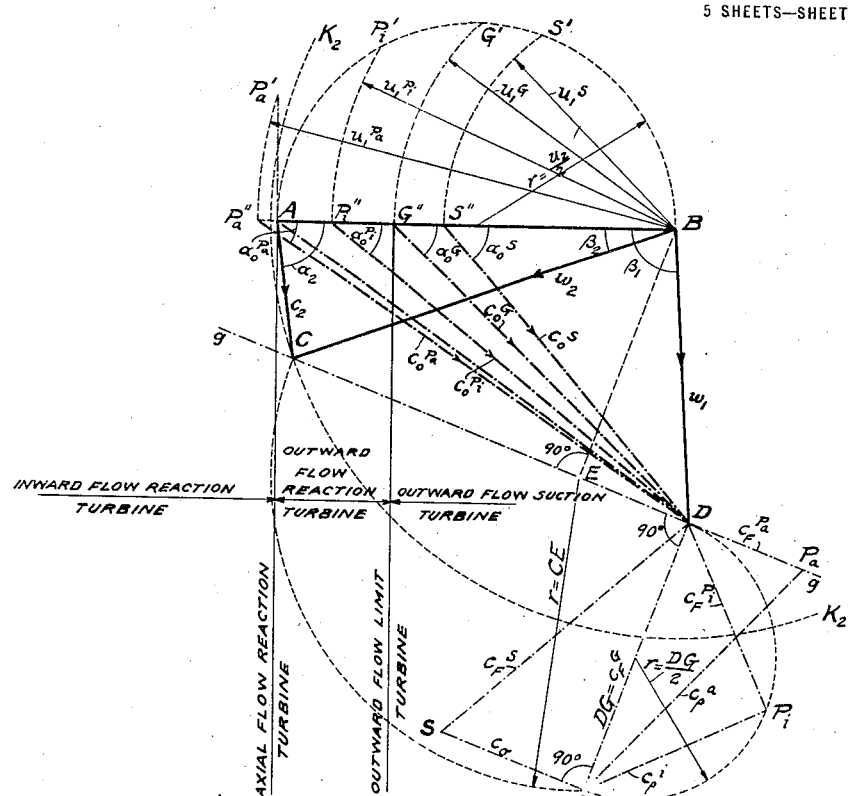
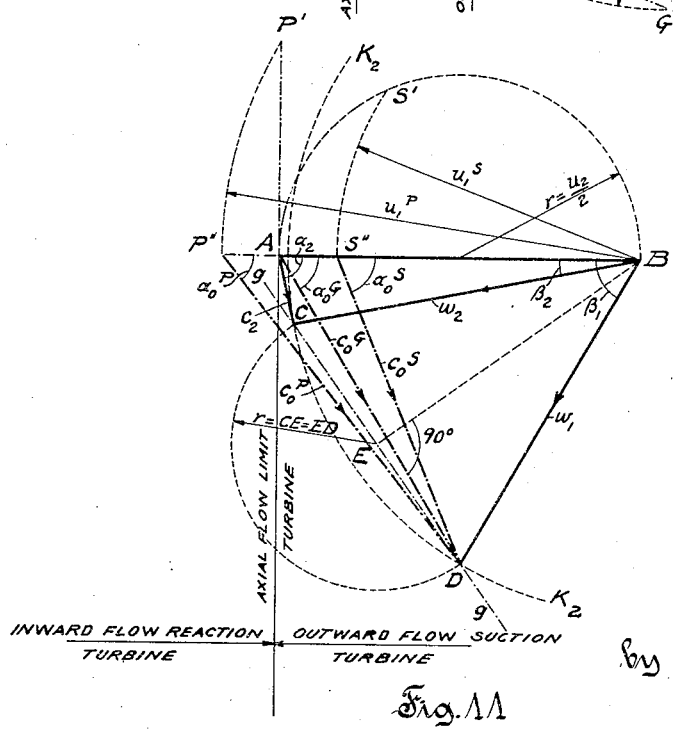

UNITED STATES PATENT OFFICE.

HANS BAUDISCH, OF VIENNA, AUSTRIA, ASSIGNOR TO ALLIS-CHALMERS MANUFACTURING COMPANY, OF MILWAUKEE, WISCONSIN, A CORPORATION OF DELAWARE.

HYDRAULIC PROCESS OF AND APPARATUS FOR CONVERTING ENERGY.

1,347,578.  Specification of Letters Patent.  Patented July 27, 1920.

Application filed May 8, 1916. Serial No. 96,731.

*To all whom it may concern:*

Be it known that HANS BAUDISCH, a subject of the Emperor of Austria, residing at Vienna, Austria, has invented a certain new and useful Hydraulic Process of and Apparatus for Converting Energy, of which the following is a specification.

This invention relates to a hydraulic process of and apparatus for converting energy into another form.

The object of the invention is to utilize a process and to produce an apparatus whereby energy will be converted into another form in such a way that it is possible to secure high speeds of rotating parts.

A clear conception of the invention may be had by referring to the drawings accompanying and forming a part of this specification in which like reference characters designate the same or similar parts and values.

Figure 1 is a diagrammatic view graphically showing the relative directions and values of inlet and discharge velocities with reference to the velocity of the vanes of a wheel.

Fig. 2$^a$ is a fragmentary central section of a water wheel showing ventilation of clearance space between guide casing and runner.

Fig. 2$^b$ is a fragmentary central section of a water wheel and its guide casing forming a conduit leading thereto and showing ventilation of a runner by air ports through the inclosing rim thereof.

Fig. 5 is a diagrammatic view graphically determining the type of turbine from a comparison of its inlet velocity characteristics with its discharge velocity, in the special case where the lines representing the inlet velocities terminate in the same straight line.

Fig. 6$^a$ is a diagrammatic view generally determining the type of turbine from its inlet velocity characteristics as compared with an assumed discharge velocity.

Fig. 6$^b$ is a diagrammatic view generally determining the type of turbine from its discharge velocity characteristics as compared with an assumed inlet velocity.

Fig. 7$^a$ is a diagrammatic view of turbine blading applicable to this invention, showing greater deflection than that of Fig. 7$^b$.

Fig. 7$^b$ is a diagrammatic view of turbine blading applicable to this invention, showing less deflection than that of Fig. 7$^a$.

Fig. 8 is a diagrammatic view graphically indicating the relations between velocity characteristics of an axial flow turbine of the suction type and the relative values of the axial thrust (K), and of the driving force ($g\eta H/u_1$).

Fig. 9 is a fragmentary sectional view of an axial flow suction turbine wheel indicating the nature of the flow when it "cuts loose" from the walls of the runner spaces.

Fig. 10 is a diagrammatic view graphically indicating the inlet and discharge velocity relations and direction of flow, in radial flow reaction, limit and suction turbines, where the discharge velocity relative to the wheel is greater than the relative inlet velocity (including modification for centrifugal force).

Fig. 11 is a diagrammatic view similar to Fig. 10, but where the inlet and discharge velocities relative to the wheel are equal (including modification for centrifugal force).

Figure 12:
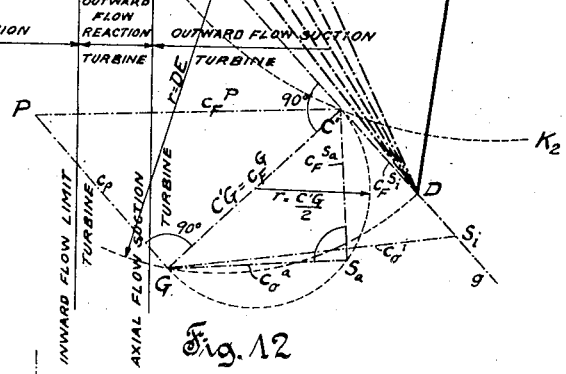

Fig. 12 is a diagrammatic view similar to Figs. 10 and 11, but where the discharge velocity relative to the wheel is smaller than the relative inlet velocity (including modification for centrifugal force).

Figure 13A:
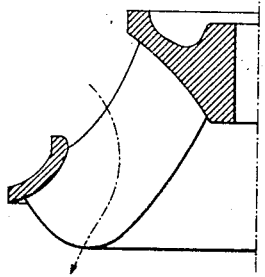
Figure 13B:
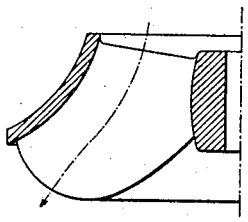

Fig. 13$^a$ is a fragmentary central section of a suction type of water wheel more readily adaptable for use with swivel gates of the Fink type.

Fig. 13$^b$ is a fragmentary central section of a suction type of water wheel of a design especially for high speeds.

Figure 14:
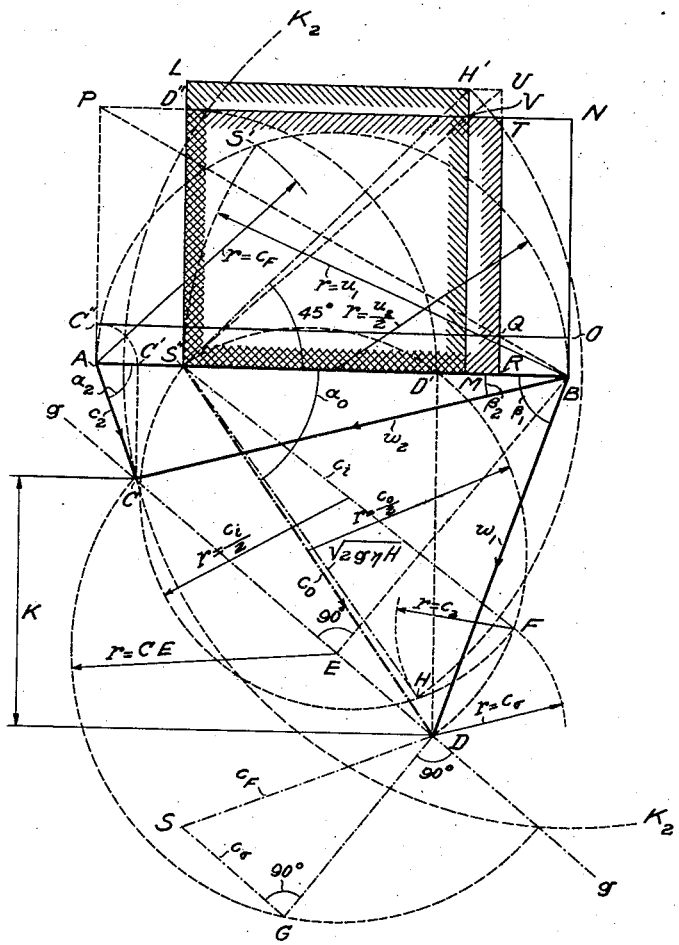

Fig. 14 is a diagrammatic view similar to Fig. 8, graphically indicating the velocity characteristics of an outward flow suction turbine in which the accelerating effect of the centrifugal force predominates over the decelerating effect of the inherent design of suction turbine.

Figure 15:
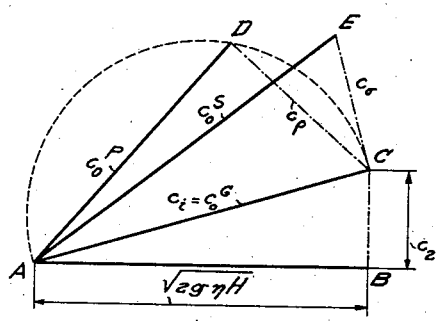

Fig. 15 is a diagrammatic view graphically comparing the discharge velocities from the guide vanes (absolute inlet velocities to wheel) of pressure, limit and suction turbines for H, as expressed by the equations $8_P$, $8_G$, $8_S$ and 10.

Figure 16:
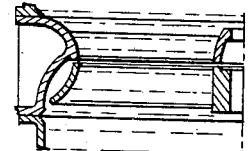

Fig. 16 is a fragmentary central vertical section through a casing and a runner sealed from atmosphere with the channels therethrough filled with water.

Figure 17:
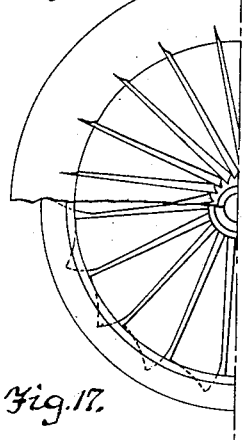

Fig. 17 is a fragmentary plan view of the same.

Figures 2A, 2B:
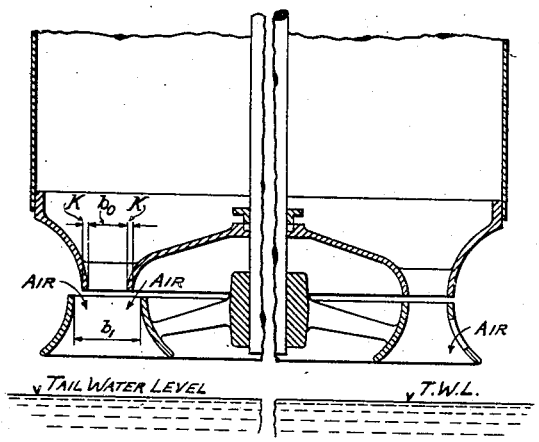
Figure 1:
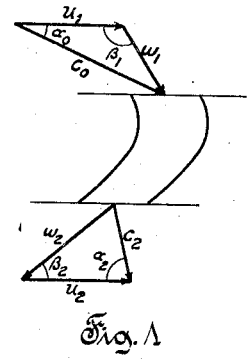

The second fundamental equation for full gated turbines with runner spaces completely filled is as follows, referring to reference characters of Fig. 1:

$$c_0 u_1 \cos \alpha_0 - c_2 u_2 \cos \alpha_2 = g\eta H \quad (1)$$

For $\alpha_2 = 90$ degrees, that is, assuming for the sake of simplicity, vertical discharge of water from the runner spaces, the above equation is reduced as follows:

$$c_0 u_1 \cos \alpha_0 = g\eta H \quad (1_a)$$

According to the law of sines, we obtain from the entrance triangle $c_0/u_1 = \sin \beta_1/\sin(180 - \alpha_0 - \beta_1)$.

By combining this equation with $(1_a)$ the well known relation is derived, $$c_0 = \sqrt{g\eta H} \sqrt{\sin \beta_1/\sin(180 - \alpha_0 - \beta_1)\cos \alpha_0} \quad (2)$$

The velocity of the water leaving the guide casing as calculated from equation (2) will be:

$$c_0 \lessgtr \sqrt{2g\eta H}$$

depending on whether, $$\sqrt{2} \lessgtr \sqrt{\sin \beta_1/\sin(180 - \alpha_0 - \beta_1)\cos \alpha_0},$$

which relation simplifies to $180 - \beta_1 > 2\alpha_0$ for a reaction (overpressure) turbine............($3_P$)
$180 - \beta_1 = 2\alpha_0$ for a limit (pressureless) turbine..............($3_G$)
$180 - \beta_1 < 2\alpha_0$ for a suction (underpressure) turbine..........($3_S$)

Up to the present time in turbine design, it was not desirable to apply the relation $$c_0 > \sqrt{2g\eta H},$$

appertaining especially to suction turbines, because one reasoned that this would only bring about an unnecessary increase in velocity, resulting in increased friction losses and also endangering the stability of flow on account of the underpressure prevailing between the guide casing and the runner. Therefore, so far, air was always admitted between the guide casing and the runner for condition ($3_S$), resulting in the forced development of a free flow in the runner spaces.

The admission of air is accomplished in a well known manner. When it is desired to ventilate the clearance space between the guide casing and the runner entrance, Fig. $2^a$, the entrance width $b_1$ of the runner is made larger than the discharge width $b_0$ of the guide casing, to the amount of the thickness K of the inner and outer rims. When it is desired to ventilate the runner, Fig. $2^b$, each individual runner space is ventilated through an aperture formed in the side walls of the rim. Or ventilation may be effected in the same manner as is the case with impulse bucket wheels where the rims are omitted entirely, and at most are indicated by a suitable bending up of the corners of the buckets in order to effect a corresponding guiding of the free water stream. This admission of air forceably prevents the velocity of the water leaving the guide casing from exceeding the value $$\sqrt{2g\eta H}.$$

Relation ($3_S$) therefore comprises also the "free jet" turbines, wherein the channel between the blades is not entirely filled by the flowing stream.

If, notwithstanding the objections stated above, ventilation is prevented by sealing from atmosphere the flow in a full gated free jet turbine, and a draft tube is provided into which the water discharges after leaving the runner, then the air will be expelled from the runner spaces so that these spaces will fill up with water. In order to keep the runner spaces continuously filled, it follows that the velocity of the water leaving the guide casing is necessarily larger than the spouting velocity. Thus the suction (underpressure) turbines are attained, in which the runner exerts a suction effect upon the guide casing, so that there will be a low pressure, lower than atmospheric, in the clearance space between the guide casing and the runner. From this it follows at once that suction turbines can be made to benefit by the use of draft tubes, as much as is the case with limit (pressureless) turbines, and with reaction (overpressure) turbines, and that they are also adapted to discharge larger quantities than they would if they acted as free jet turbines, for the reason that $$c_0 > \sqrt{2g\eta H}.$$

Figure 3:
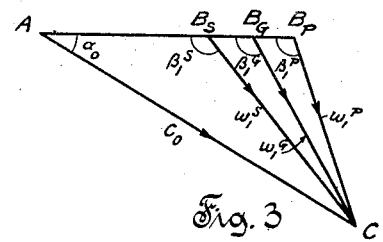
Fig. 3 is a diagrammatic view graphically showing different conditions of inlet velocity corresponding roughly to different types of turbine.

Equations (3) characterize three different entrance triangles. The isosceles triangle $AB_GC$, Fig. 3, corresponds to the limit (pressureless) turbine, according to relation ($3_G$); the triangle $AB_PC$ the reaction (overpressure) turbine, according to relation ($3_P$); and triangle $AB_SC$ the suction (underpressure) turbine, according to relation ($3_S$), or respectively, it corresponds to the typical action (impulse) turbine, if we consider the enforced discontinuity of the flow through the runner spaces. However, it may be pointed out here that these exceedingly simple relations of the angles should be considered to be only approximately correct. They are not only derived from the equations of the classic hydraulics which in fact is itself incorrect, but they are obtained from same on the basis of fundamental simplifications. The characteristics of the individual types of turbines are obtained more accurately, although in a somewhat more complicated manner, on the basis of the graphic representation of the turbine equations.

The first principal equation for full gated turbines with completely filled runner spaces is as follows:

$$w_2^2 = w_1^2 + 2g(H - H_w) - c_0^2 + u_2^2 - u_1^2 \quad (4)$$

For axial discharge turbines this equation simplifies to:

$$w_2^2 = w_1^2 + 2g(H - H_w) - c_0^2 \quad (4_a)$$

If, in considering reaction (overpressure) turbines, we introduce the expression, $$c_\rho = \sqrt{2g(H - H_w) - c_0^2} \quad (5_P)$$

for the reaction velocity, and, in considering suction (underpressure) turbines, the expression $$c_\sigma = \sqrt{c_0^2 - 2g(H - H_w)} \quad (5_S)$$

for the suction velocity, then, for the limit turbines we will have as a limit between the reaction (overpressure) turbines and the suction (underpressure) turbines, $$c_\rho = c_\sigma = 0 \quad (5_G)$$

Equations ($4_a$) can then be written:

For the reaction turbine, $w_2^2 - w_1^2 = c_\rho^2$ ............($6_P$)
For the limit turbine, $w_2 = w_1$ ..................($6_G$)
For the suction turbine, $w_1^2 - w_2^2 = c_\sigma^2$ ............($6_S$)

Figure 4:
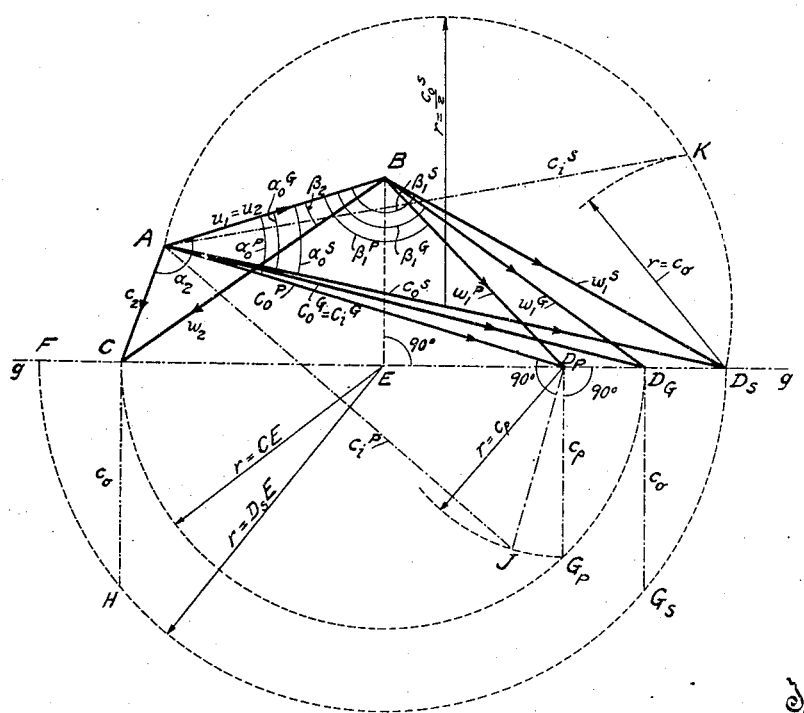
Fig. 4 is a diagrammatic view more accurately graphically indicating the determination of the velocity characteristics of the different types of axial flow ($u_1=u_2$) turbine.

By inserting the corresponding values of Fig. 4, we obtain the following tabulation:

*Pressure turbine.*

$$(w_1^P)^2 = \overline{D_PE}^2 + \overline{EB}^2$$
$$w_2^2 = \overline{EC}^2 + \overline{EB}^2$$

$$c_\rho^2 = \overline{CE}^2 - \overline{D_PE}^2$$
$$= (CE + ED_P)(CE - ED_P)$$
$$= (CD_P)(D_PD_G)$$

$$c_\rho = D_PG_P, \quad w_1^P < w_2$$

*Limit turbine.*

$$(w_1^G)^2 = \overline{D_GE}^2 + \overline{EB}^2$$
$$w_2^2 = \overline{CE}^2 + \overline{EB}^2$$

$$c_\rho = c_\sigma = 0, \quad w_1^G = w_2$$

*Suction turbine.*

$$(w_1^S)^2 = \overline{D_SE}^2 + \overline{CB}^2$$
$$w_2^2 = \overline{CE}^2 + \overline{EB}^2$$

$$c_\sigma^2 = \overline{D_SE}^2 - \overline{CE}^2$$
$$= (D_SE + EC)(D_SE - EC)$$
$$= (D_SC)(CF) = (FD_G)(D_GD_S)$$

$$c_\sigma = D_GG_S = CH, \quad w_1^S > w_2$$

The value $c_\sigma$ of the suction turbine can, therefore, be represented in a similar manner as the value $c_\rho$ of the pressure turbine. If we write $$c_i = \sqrt{2g(H - H_w)} \quad (7)$$

then we can write equations (5) as follows:

$$c_i^2 = c_\rho^2 + c_0^2 \quad (8_P)$$
$$c_i = c_0 \quad (8_G)$$
$$c_i^2 = c_0^2 - c_\sigma^2 \quad (8_S)$$

These values are represented by means of the auxiliary points J and K for the pressure turbine and the suction turbine, and distance $AD_G$ represents the value $c_i$ for the limit turbine.

From the above it follows, Fig. 5, that each point $D_P$ of the straight line $gg$ to the left of $D_G$ corresponds to a reaction (overpressure) turbine, each point $D_S$ to the right of $D_G$ corresponds to a suction (underpressure) turbine, while $D_G$ itself represents the limit (pressureless) turbine.

This can be defined still more generally by referring to Fig. 6ª, where any point $D_P$ inside of the circle $K_2$ represents the end point D of the entrance triangle of a reaction turbine; where each point $D_G$ upon the circle $K_2$ represents the same end point of the entrance triangle of a limit turbine; and where each point $D_S$ outside of the circle $K_2$ represents the end point D of the entrance triangle of a suction turbine. On the other hand, by referring to Fig. 6ᵇ, any point $C_S$ inside of the circle $K_1$ represents the end point C of the discharge triangle of a suction turbine; any point $C_G$ upon the circle $K_1$ represents the same end point of the discharge triangle of a limit turbine; and any point $C_P$ outside of the circle $K_1$ represents the end point C of the discharge triangle of a reaction turbine.

It is evident that $w_1$ is less than $w_2$ with reaction turbines, that $w_1$ equals $w_2$ with limit turbines, and that $w_1$ is greater than $w_2$ with suction turbines.

In the reaction turbine the energy is developed in the runner spaces chiefly by the acceleration of the water flowing through the same, and the maximum deflection of the water stream lines is of inferior importance. In the limit turbine [and of course in the true action (impulse) turbine] the energy is developed in the runner spaces by the deflection of the water along the concave surface of the runner blade. In the suction turbine however, the energy results from the deceleration of the water flowing through the runner spaces. (This of course, is done by progressively increasing the cross-section of the runner spaces.) Hence here, as in the case of the reaction turbine, the requirement of maximum deflection of the stream lines is of inferior importance. Consequently, not only a curvature of the runner blades as shown in Fig. 7$^a$, but also one as shown in Fig. 7$^b$ is perfectly feasible. It therefore follows that the suction turbine is a type in which high peripheral speeds are obtainable.

In every case the energy is developed by conversion of the absolute velocity of the water flowing through the runner, which conversion results from the impulse (pressure exerted by water in motion which is due to its kinetic energy) of the water against the leading sides of the runner channels, and is always a consequence of deflection. Any static pressure in the runner channels is mainly balanced with reference to the rotary motion of the runner.

In the limit turbine, and in the free jet or impulse turbine, the velocity converted into power is derived directly from that which is due only to the hydrostatic head. The deflection of the stream and consequent development of power involves deceleration of its absolute velocity.

In the reaction turbine, the velocity of the stream due to the hydrostatic head is enhanced as it passes through the runner, by the nozzle effect of each runner channel which diminishes in sections normal to the direction of travel of the stream from the point of entrance to the point of exit, in comparison with what those sections would be in an otherwise similar limit turbine. In the determination of the velocity of flow through a runner the flow through which has a greater or less radial component, the centrifugal force must be considered and might even so affect the velocity as to be less at the outlet than at the inlet of the runner. In the reaction turbine therefore where the runner channel is progressively diminishing in section, and assuming a given angle of deflection and amount of energy imparted to the runner, the relative velocity of the stream of water passing any point in the runner channel is accelerated in comparison with what it would be in the absence of the nozzle effect due to such diminution of section of the runner channel. But the runner abstracts more energy from the stream, having a greater velocity to derive energy from, than it would with the same angle of deflection in the absence of the nozzle effect. Thus the energy developed in a reaction turbine is chiefly due to acceleration of the relative velocity of the stream, notwithstanding the fact that the energy abstracted from the stream by the runner reduces the absolute velocity, and may, on account of the effect of centrifugal force, as for instance in radial inward flow turbines, even reduce the actual relative velocity at the point of exit in comparison with the corresponding velocity at the point of entrance.

In the suction turbine, in which each runner channel enlarges between the inlet and the outlet in sections normal to the direction of the stream, and the runner channels are kept full of water during the operation, the form of each runner channel produces a deceleration of the relative velocity of the stream, that is, the relative velocity which it has at the point of exit is less in comparison with the relative velocity which it has at the point of entrance. The immediate effect of that deceleration is the conversion of relative velocity into static pressure, which can have little direct effect upon the rotation of the runner since static pressures in the runner channels are mainly balanced with reference to that motion. But this conversion produces a suction effect at the point of entrance, in consequence of which if air be excluded, the absolute velocity of the stream at that point is increased and more water is admitted to the runner. In consequence of this increment, with a suitable design of the runner, the total amount of kinetic energy in the stream which may be converted into usefully applied power is increased in comparison with the total amount of kinetic energy which may be so converted derived from the unmodified hydrostatic head. This result is indirectly attained by deceleration of the relative velocity of the stream flowing through the runner.

The showing in Fig. 5 of the velocity of a suction turbine having a forwardly vaned runner, is therefore changed to that of Fig. 8. From this it follows that the angle $\alpha_0$ becomes large on account of the small angle $\beta_1$. Large angles $\alpha_0$ correspond to large openings between the guide vanes, therefore only a moderate width of guide casing is necessary to produce the desired discharge capacity of the turbine. The suction turbine therefore, is characterized by a much less height of guide casing. If this is an advantage in reducing the energy required for regulation following the more rugged construction of the guide casing, it is of the greatest advantage with very low heads and of consequent compact construction, as in this way much can be saved in construction costs.

The steep inclination of line $qg$, Fig. 8, compared with that of line AB indicates a large axial thrust of the turbine. The reaction force R measured in axial direction of the water flowing through the full runner spaces is made known by:

$$R = Q\gamma/g(w_2 \sin \beta_2 - w_1 \sin \beta_1) \quad (9)$$

If we assign a value to the expression between the brackets $$w_2 \sin \beta_2 - w_1 \sin \beta_1 = -K,$$

then K is represented in Fig. 8 by the vertical distance between points C and D. The negative character indicates that the suction turbine itself develops a considerable relief from axial thrust, since the axial thrust acts in opposite direction to the flow of the water.

In the special case of the axial turbine where $u_1$ equals $u_2$, equation (1) is transformed into $$c_0 \cos \alpha_0 - c_2 \cos \alpha_2 = g\eta H/u_1 \quad (1_b)$$

This value results in Fig. 8 as the horizontal distance between the two points C and D. If AL is made equal to BM equal to $g\eta H/u_1$, then the area of the rectangle ALMB will equal $g\eta H$. On the other hand, if a rectangular triangle is drawn with AH equal $c_1$ as hypotenuse, and with HJ equal $c_2$ as one of the other two sides, then AJ represents the value $\sqrt{2g\eta H}$, since $$2g\eta H = c_1^2 - c_2^2 \quad (10)$$

By means of the auxiliary diagram AJ=AN, and where angle NAB=45 degrees, we obtain in AN the diagonal of the square AONP, the area of which is again $g\eta H$. With a correct diagram therefore, the three points A, Q and R are located on a straight line.

This diagram indicates that the suction turbine is a hydraulic prime mover equally as important as a reaction turbine. The efficiency of a suction turbine may possibly be less favorable, on account of the very high velocity $c_0$ of water leaving the guide casing, and also on account of the very high relative velocity $w_1$. However, due to the reduced curvature of the guide vanes and runner blades, the friction and curvature losses will be of less importance in both directing systems (of the suction turbine). The reduced diversion permits of a shorter development of both guide vanes and runner blades, without increasing the resistance due to the diversion. The most serious objections to the suction turbine lie in the required relative retardation of the water in the runner space, since the velocity $w_1$ must be reduced to $w_2$ within this runner space. This may lead to a "cutting loose" of the water from the walls of the spaces, whereby a main flow H, Fig. 9, may be formed within the runner space, of almost unreduced velocity $w_1$ through the entire runner space, and in addition to this main flow a secondary or eddy flow N which is not only energy destroying but also prevents the relative retardation which is the very feature of the suction turbine. These objections will be dispelled at once if one considers the feasibility of applying the principle of the suction turbine to a radial flow turbine or to turbines of mixed flow.

For the purpose of subjecting the radial flow turbine to a graphical analysis, (wherein must be considered centrifugal force of the water because of its moving from its inlet position at a certain distance from the axis, to its discharge position at a different distance from the axis,) we may refrain from the usual procedure of introducing an auxiliary value $$(w_2^1)^2 = w_2^2 + u_1^2 - u_2^2 \quad (11)$$

into equation (4), as this would only render the procedure less clear. Instead, the velocity $c_F$ may be introduced, which corresponds to the centrifugal force, stated as $$\pm c_F^2 = u_2^2 - u_1^2 \quad (12)$$

Here the plus sign of $c_F^2$ applies to outward flow turbines and the minus sign to inward flow turbines. As in outward flow turbines the acceleration developed from the centrifugal force is positive and in inward flow turbines negative, the runner chutes in either case must have a corrective component of cross-section increasing the same at their ends nearer the axis or decreasing the same at their ends farther from the axis. Thus equation (4) in the case $w_2 > w_1$, is transformed into:

For the reaction turbine, $w_2^2 - w_1^2 = c_p^2 \pm c_F^2$ .................... (13$_P$)

For the limit turbine, $w_2^2 - w_1^2 = + c_F^2$ ........................ (13$_G$)

For the suction turbine, $w_2^2 - w_1^2 = + c_F^2 - c_\sigma^2$ .................. (13$_S$)

From the above equations it is evident that the reaction turbine can be a radial inward flow turbine, as well as an axial flow turbine, and a radial outward flow turbine, whereas the limit and the suction turbines can be radial outward flow turbines only. This conclusion can be drawn still better from Fig. 10. If the discharge triangle ABC and also in BD the relative velocity $w_1$ in length and direction are so located that point D falls inside of circle $K_2$ (compare also Fig. 6$^a$), then we obtain the value $$\sqrt{w_2^2 - w_1^2}$$

as DG which is normal to $gg$. This length DG can be taken as being the value $c_F^G$ of a limit turbine according to equation (13$_G$); according to equation (13$_S$) as base (or altitude) of a rectangular triangle DGS; according to equation (13$_P$) either as hypotenuse of a rectangular triangle DGP$_1$, or as base (or altitude) of a rectangular triangle DGP$_a$. In the special instance, where $c_F$ equals 0 in equation (13$_P$), the distance DG represents the value $c_p$ of an axial flow turbine.

Since the value $c_F$ appears as the base (or altitude) of a rectangular triangle according to equation (12), the hypotenuse of which is $u_2$ for an outward flow turbine, and the hypotenuse of which is $u_1$ for an inward flow turbine, it follows that the entrance triangle of the turbine can be laid out in each case as follows:

A semicircle is drawn over $AB=u_2$, and point $G'$ is located upon the circle at a distance $DG=c_F^G$ from point A, then we obtain $$G'B=G''B=u_1^G,$$

or the entrance peripheral velocity of the outward flow limit turbine, the guide vane angle of which $\alpha_0^G$. All points $S'$ located on the arc $G'B$ correspond to the outward flow suction turbine, wherein $$AS'=DS=c_F^S$$

at all times, and $$BS'=BS''=u_1^S.$$

All points $P_i'$ however, located on the arc $AG'$ correspond to the outward flow reaction turbine wherein $$AP_i'=DP_i=c_F^{P_i},$$

and $$BP_i'=BP_i''=u_1^{P_i}.$$

In case $P_i'$ coincides with A, we obtain $$c_F^{P_i}=0,$$

and consequently $u_2=u_1$ according to equation (12). Point A therefore, corresponds to the axial flow reaction turbine. If a normal is formed on AB at A, then each point $P_a'$ of that normal corresponds to an inward flow reaction turbine, wherein for $$AP_a'=DP_a=c_F^{P_a}$$

the entrance peripheral velocity of this turbine is obtained from $$P_a'B=P_a''B=u_1^{P_a}.$$

In case $w_2=w_1$, the equations (13) will become:

For the reaction turbine, $c_\rho^2-c_F^2=0$ .................(14$_P$)
For the limit turbine, $c_F=0$ .................(14$_G$)
For the suction turbine, $c_F^2-c_\sigma^2=0$ .................(14$_S$)

From the above equations it is evident that the reaction turbine can here be an inward flow turbine only, the limit turbine an axial flow turbine only, and the suction turbine an outward flow turbine only. This also follows from Fig. 11 which is typical inasmuch as point D is located on the circle $K_2$ (compare also Fig. 6$^a$). With $$AS'=c_\sigma=c_F^S$$

the entrance peripheral velocity of a suction turbine is obtained from $$BS'=BS''=u_1^S.$$

The entrance peripheral velocity of a reaction turbine is obtained with $$AP'=c_\rho=c_F^P$$

from $$BP'=BP''=u_1^P.$$

Here, in the semi-circle erected on AB, point $G'$ of Fig. 10 has been removed to a certain extent toward A, but with $c_F^G=0$, according to equation (14$_G$), point $G'$ coincides with A.

In case $w_2<w_1$, the equations (13) will become:

For the reaction turbine, $w_1^2-w_2^2=c_F^2-c_\rho^2$ .................(15$_P$)
For the limit turbine, $w_1^2-w_2^2=c_F^2$ .................(15$_G$)
For the suction turbine, $w_1^2-w_2^2=c_\sigma^2\mp c_F^2$ .................(15$_S$)

From which it follows that the reaction turbine and the limit turbine in this case can be an inward flow turbine only, that on the other hand, the suction turbine in this case can be conceived as of inward flow, pure axial flow, as well as of outward flow. Graphically shown, Fig. 12, point D will be located outside the circle $K_2$ (compare also Fig. 6$^a$). The entrance peripheral velocity of a corresponding inward flow limit turbine is obtained from $$G'B=G''B=u_1^G$$

with $$C'G=\sqrt{w_1^2-w_2^2}$$

and with $C'G=AG'$. All points $P''$ on line AB located on the left of $G''$, correspond to an inward flow reaction turbine; all points $S_a''$ located between $G''$ and A, correspond to an inward flow suction turbine; and finally, all points $S_i''$ located to the right of A, correspond to an outward flow suction turbine. Point A proper however, represents the axial flow suction turbine. Here also according to equation (15$_P$), $C'G$ can be considered as the altitude (or base) of a rectangular triangle $C'GP$ belonging to a reaction turbine the hypotenuse of the triangle being $PC'=c_F^P$, and the other leg being $PG=c_\rho$. Similarly according to equation (15$_G$), $C'G$ can be considered as the $c_F^G$ of a limit turbine, or according to equation (15$_S$) as hypotenuse of triangle $C'GS_a$, or as the base (altitude) in triangle $C'GS_i$ from which the suction velocity $c_\sigma^a=GS_a$ can be obtained in the first case, and $c_\sigma^i=GS_i$ in the second case.

From the last three diagrams it can be realized that an extended field of application is possible with the suction turbine. With reference to Fig. 9 however, the suction turbine may have the greatest prospect when $$w_2 \gtreqqless w_1,$$

which is complied with in all designs shown in Figs. 10 and 11, where the relative retardation typical with the suction turbine, is surpassed (Fig. 10) or at least compensated for (Fig. 11) by acceleration due to the centrifugal force effective because of the water's moving to a different distance from the axis while flowing from its inlet position to its discharge position.

This typical relative retardation may be considered to correspond to a component inlet section and a larger component outlet section across the flow through the runner, and the acceleration due to centrifugal force may be considered to correspond to complementary components of inlet and discharge sections added to the first mentioned component sections, the complementary components being of size varying in inverse functional relation to the centrifugal force at the inlet and discharge, that is, the larger the force the smaller the complementary component section. Thus the typical designs to be expected with a suction turbine runner are already fixed. They may look like Fig. 13$^a$ or Fig. 13$^b$. Fig. 13$^a$ permits of an easier application of the swivel gate type of guide vanes as introduced by Fink. Fig. 13$^b$ has the advantage of offering the construction of a runner of highest speed on account of its small entrance diameter. With the first design of runner the requirements $$w_2 \geqq w_1,$$

may be set at the outer discharge portions of the runner but not at the inner portions, so that here possibly the mentioned secondary condition of flow (pumping action of the runner blades) may appear. This is more easily obviated with the runner design made as shown in Fig. 13$^b$. The question whether the adaptability for the use of swivel gates is of such great advantage may remain open especially, if the purpose of application of the suction turbine is kept in mind.

A suction turbine with acceleration of the water in the runner spaces (by reason of the surpassing of the deceleration due to the inherent design of suction turbine by the acceleration of the predominating centrifugal force) is more elaborately developed in Fig. 14 similarly to Fig. 8. The value $$\sqrt{w_2^2 - w_1^2}$$

has been derived from the discharge triangle ABC and from the relative velocity $w_1$ as DG. Assuming arbitrarily $GS = c_\sigma$, one obtains $DS = c_F$. Since $c_F = AS'$, according to equation (12) we obtain $BS' = BS'' = u_1$, whereby $S''D = c_0$, $S''F = c_1$ and $$S''H = \sqrt{2g\eta H}$$

seem to be obtained. With $S''H = S''H'$, whereby angle $H'S''B = 45$ degrees, we obtain the square $S''LH'M$ the side of which is $$\sqrt{g\eta H}.$$

According to equation (9) the vertical distance K between the points C and D again represents the axial thrust produced by each kilogram of the discharge quantity per second and acting in opposite direction to the flow.

If C' is the projection of point C, D' that of D' upon line AB, then we obtain $$AC' = AC'' = c'_2 \cos \alpha_2,$$

and $$S''D' = S''D'' = c_0 \cos \alpha_0,$$

and consequently the values $$c_2 u_2 \cos \alpha_2$$

and $$c_0 u_1 \cos \alpha_0$$

in the areas of the rectangles ABOC'' and S''BND''. With the auxiliary points P and Q, the first mentioned rectangle becomes rectangle RBNT of equal area, and therefore the area of the rectangle S''RTD'' represents also the value $g\eta H$ according to equation (1). From this it follows that the square first referred to and the rectangle last referred to must be of equal area, consequently the points S'', V and U must be located on a straight line.

From all of these investigations it can be seen that the suction turbine greatly widens the field of utilization of water power. Its future will not be found so much with high heads, but more so in cases where it is a question of commercial development of low heads. As the turbine systems already known are completely sufficient for the turning to account of larger heads, the suction turbine should be only cautiously employed here, for one reason, because zero pressure may soon occur between guide casing and runner on account of the suction effect at that place, which in turn would cause a "cutting loose" of the suction column, or, for another reason, because of the possible extraction of air in the clearance between guide casing and runner produced by the low pressure at that place, corrosion may be brought about the same as is the case with limit turbines. Both conditions are of no importance with the development of low heads, and it is just in this instance also where the moderate height of the guide casing of the suction turbine will be of importance as regards cost of the construction of its setting. The higher the specific speed of a runner the better it will be adapted for low head plants, and it is in just this direction that the suction turbine is adapted to supplant the reaction turbine.

Of all turbine types the suction turbine possesses the highest discharge velocity between the guide vanes. If this is not sufficiently clear from the figures thus far discussed, due to the fact that the velocity values derived from same are not based upon the same head, it can be seen immediately from Fig. 15 which represents equation (10) and equations (8). It can be seen that for the same $\eta H$ the suction turbine possesses a discharge velocity between the guide vanes, which must always be in excess of that of the other turbine systems. This high discharge velocity between guide vanes and the large angle $\alpha_0$ of the guide vane, permit in the suction turbine of employing very small entrance diameters with large quantities of water. A resourceful field of application of the suction turbine will especially be the flood water turbine as well as that utilizing the power of the tides. It will even be called upon as a stream turbine to utilize those water powers of the streams which heretofore were considered commercially impracticable of development. If a stream cannot be dammed up then its stream velocity can be brought to the guide casing of a suction turbine by means of suitable shaped feeder penstocks. This velocity will be increased in the guide casing due to the suction reaction of the runner upon the guide casing, and will be reduced to a low discharge velocity from the runner by transmitting the energy to the runner. In case of absence of a dam (which really is the essential point of a stream flow development), the turbine is flooded, so that the water passing over same can be compelled to play the rôle of increasing the head by its suction action upon the discharge of the runner.

Figs. 16 and 17 are pictorial illustrations of the features of the expanding runner channels showing them sealed from atmosphere and full of water as they are during operation.

It is self evident that the characteristics of a suction turbine can be applied also to other hydraulic machines, but this however will not be further considered here.

It should be understood that it is not desired to be limited to the exact details of the process disclosed nor to the exact details of construction shown and described, for obvious modifications will occur to a person skilled in the art.

It is claimed and desired to secure by Letters Patent,—

1. The process of translating energy contained in a stream of water to energy of another form which consists in modifying the flow through a rotor located within said stream whereby independent of the effect of the centrifugal force on the flow a deceleration thereof would tend to be produced.

2. The process of translating energy contained in a stream of water to energy of another form by conducting said stream to a movable member sealed from atmosphere and causing a translation of energy between said member and said stream by modifying the flow whereby independent of the effect of the centrifugal force on the flow a deceleration of the flow through said member would tend to be produced at least as to some of the stream lines.

3. In a hydraulic turbine motor, the combination of a rotor, and a conduit leading to said rotor and sealing the flow thereto from atmosphere, said rotor having its inlet section across the flow smaller than its discharge section across the flow.

4. In a hydraulic turbine motor, the combination of a rotor, and a conduit leading to said rotor and sealing the flow thereto from atmosphere, said rotor having its inlet section across at least some of the stream lines of the flow smaller than its discharge section across the same stream lines.

5. The process of translating energy in the rotor of a hydraulic turbine motor which consists in modifying the flow through said rotor whereby independent of the effect of the centrifugal force on the flow a deceleration thereof would tend to be produced.

6. The process of converting energy from one form to another by conducting to a turbine motor rotor a stream line flow of water sealed from atmosphere and causing a translation of energy between said rotor and said flow by modifying same whereby independent of the effect of the centrifugal force on the flow a deceleration of the flow through said rotor would tend to be produced at least as to some of its stream lines.

7. The process of converting energy from one form to another by conducting to a movable member a stream line flow sealed from atmosphere and abstracting therein the energy of said flow by modifying the flow through said member whereby independent of the effect of centrifugal force on the flow a deceleration of the flow through said member would tend to be produced at least as to some of its stream lines.

8. The process of converting energy from one form to another by conducting to a movable member a flow of water sealed from atmosphere and abstracting therein the energy of said flow by modifying the flow through said member whereby independent of the effect of centrifugal force on the flow a deceleration of the flow through said member would tend to be produced.

9. The process of converting energy from one form to another by establishing in a conduit a flow of water and abstracting in a movable member therein the energy of said flow by modifying the flow through said member whereby independent of the effect of centrifugal force on the flow a deceleration of the flow through said member would tend to be produced.

10. In a hydraulic turbine motor, the combination of a rotor, and a conduit leading to said rotor and sealing the flow thereto from atmosphere, said rotor having its inlet section across at least some of the stream lines of the flow smaller than its discharge section across the same stream lines.

11. In a hydraulic turbine motor, a rotor having the flow thereto sealed from atmosphere and having a component inlet section across the flow therethrough and a larger component discharge section across the flow and said rotor having complementary corrective components of inlet and discharge section increasing the said section at their ends nearer the axis of said rotor or decreasing the same at their ends farther from the said axis.

12. In a hydraulic turbine motor, the combination of a rotor and a conduit leading to said rotor and sealing the flow thereto from atmosphere, said rotor having a component inlet section across at least some of the stream lines of the flow and a larger component discharge section across the same stream lines, and complementary components of inlet and discharge sections across the same stream lines respectively added thereto of size bearing an inverse functional relation to the centrifugal force at said inlet and discharge sections.

13. In a hydraulic turbine motor, the combination of a rotor, and a conduit leading to said rotor and sealing the flow thereto from atmosphere, said rotor having a component inlet section across the flow therethrough and a larger component discharge section across the flow, and complementary components of inlet and discharge sections respectively added thereto of size bearing an inverse functional relation to the centrifugal force at said inlet and discharge sections.

In testimony whereof, the signature of the inventor is affixed hereto.

HANS BAUDISCH.